Figure 3:
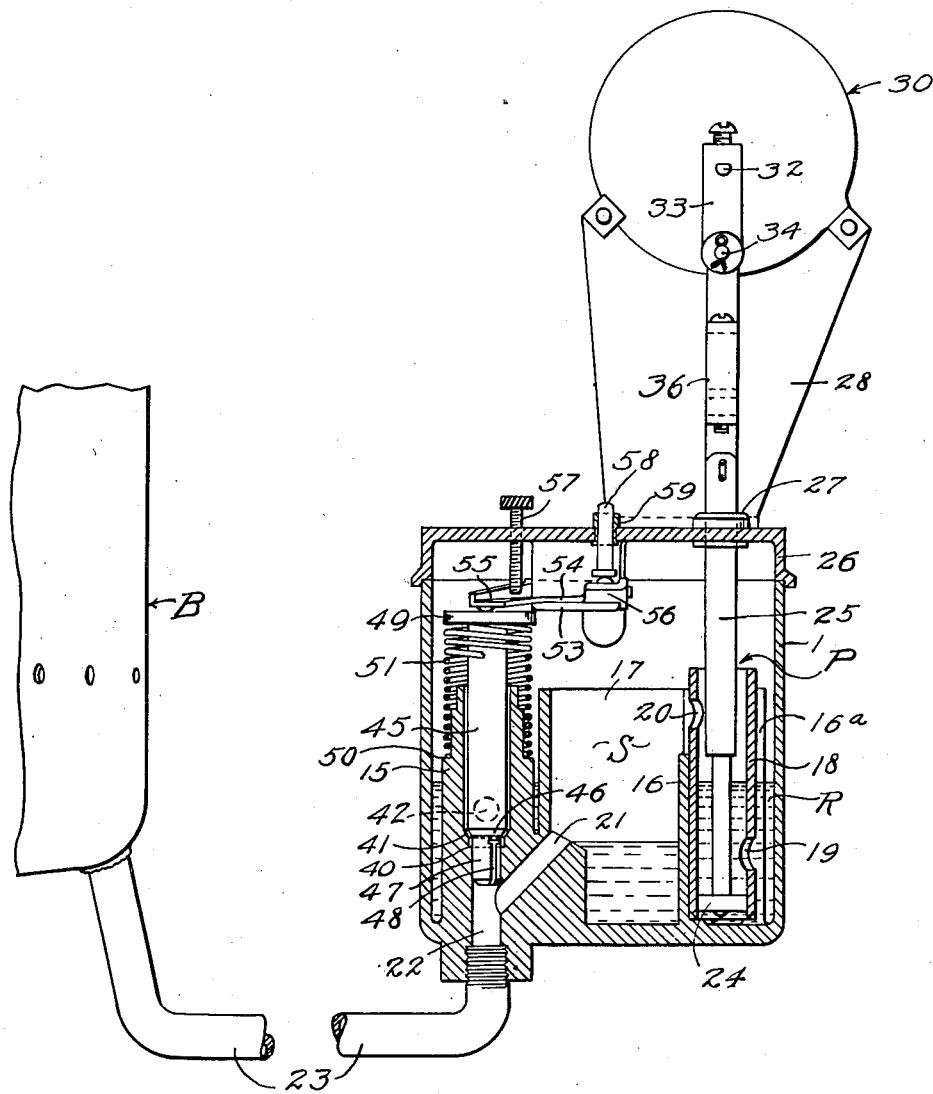

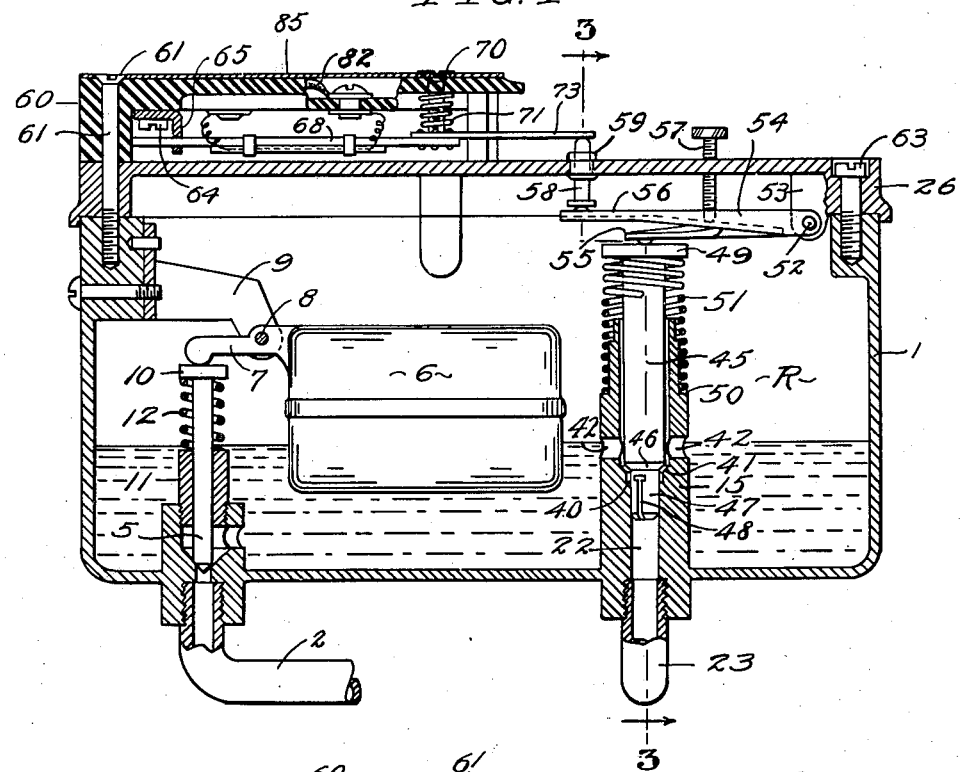

March 22, 1949.   M. RESEK ET AL   2,465,119
THERMOSTATIC DEVICE OF THE BIMETAL STRIP TYPE
Filed Feb. 2, 1946   3 Sheets-Sheet 2

INVENTORS,
Marc Resek and
BY Holden B. Townley,

ATTYS.

March 22, 1949.    M. RESEK ET AL    2,465,119
THERMOSTATIC DEVICE OF THE BIMETAL STRIP TYPE
Filed Feb. 2, 1946    3 Sheets-Sheet 3

INVENTORS,
Marc Resek and
BY Holden B. Townley

ATTYS.

Patented Mar. 22, 1949

2,465,119

UNITED STATES PATENT OFFICE 2,465,119

THERMOSTATIC DEVICE OF THE BIMETAL STRIP TYPE

Marc Resek and Holden B. Townley, Cleveland Heights, Ohio, assignors to Perfection Stove Company, Cleveland, Ohio, a corporation of Ohio Application February 2, 1946, Serial No. 645,146

9 Claims. (Cl. 60—23)

This invention is in the class of thermostatic devices of the kind in which bimetal strips are employed as the thermosensitive elements, and it consists of an improved device of this kind, disclosed herein as a part of a liquid fuel feeding means shown and described in an application filed by one of the present applicants, Holden B. Townley, on December 29, 1945, Serial No. 638,225. In that case, as in the present, the thermostatic device controls a valve by which the supply of fuel to a three-stage burner is governed, the device acting to cause the valve to move from an intermediate position in one direction to full open position for producing. high fire, or in another direction to closed position for effecting low fire. Under the latter circumstances, the fuel is fed by a constantly operating pump disclosed and claimed in said application.

Heretofore, in the actuation of such valves, two independent bimetal strips have been used, one for accomplishing high fire and the other low fire.

A general object of the present invention is to provide a simple, reliable and compact thermostatic unit for controlling the action of a member that is movable in different directions from a given position, as, for example, a valve of the character above described.

A more limited object is to provide a thermostatic unit of the bimetal strip variety which controls the movements of a member, such as a valve, in either of two directions from an intermediate position, and which unit is characterized by two functional sections, integral or otherwise, but desirably integral, with each of which sections is associated an individual heating means, preferably in the form of an electrical resistor. Adjacent ends of the two bimetallic strip sections are connected together and supported for slight rocking movement, while the opposite end of one section is anchored, and that of the other has operative connection with the member whose movements are to be controlled.

In the production of such a unit, we at present prefer to die stamp it, in U-shape, from a piece of bimetallic sheet material so as to provide two integrally connected branches that constitute the aforesaid functional sections.

It will be understood, however, that the invention is susceptible to embodiment in various forms. The one disclosed herein has proven to be highly satisfactory, and while we shall proceed to describe it in detail, we do not limit ourselves to the structural details illustrated and described further than required by the claims annexed hereto.

Figure 4:
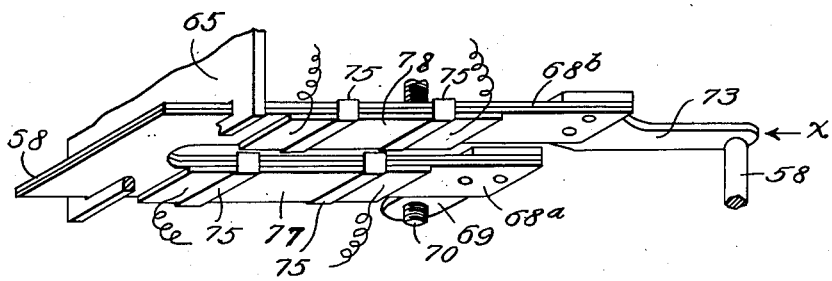
Figure 5:
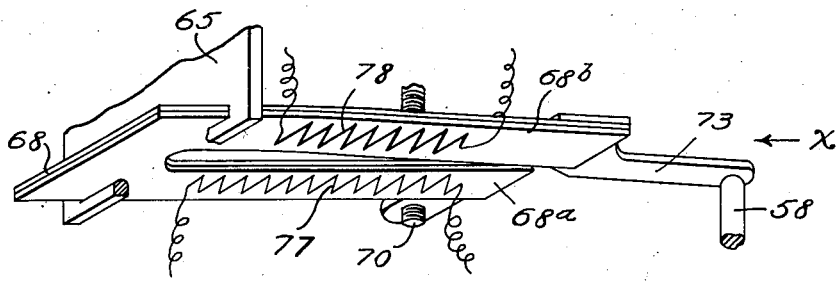
Figure 6:
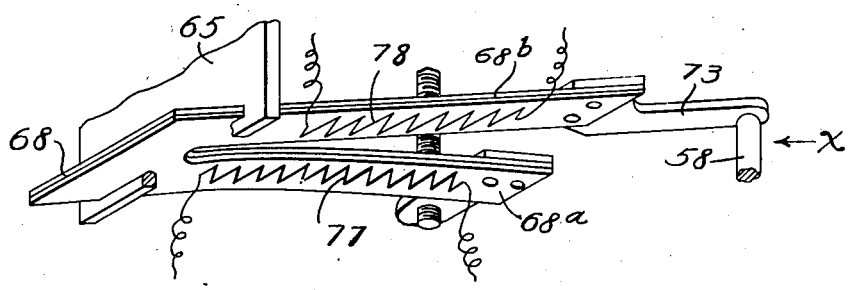

In the accompanying drawings, Fig. 1 is a sectional side elevation of liquid fuel feeding means incorporating our improved thermostatic device, the section being in offset planes, as indicated by the line 1—1 of Fig. 2, with certain parts of the thermostatic device and the elements under the control thereof shown in elevation forwardly of the plane of section; Fig. 2 is a plan view of the fuel feeding means, including the thermostatic control, but with the pump operating mechainsm omitted and the bracket by which it is supported shown in section; Fig. 3 is a section substantially on the line 3—3 of Fig. 1; Fig. 4 is a fragmentary perspective view of the thermostatic device, showing the bimetallic strip sections in normal condition, as when unheated, and Figs. 5 and 6 are similar views, more diagrammatic in character, showing the conditions of the bimetallic strip sections when one or the other is heated.

Turning now to a more detailed description of the invention and its environs, using reference characters to designate the parts shown in the drawings, 1 denotes a receptacle to which liquid fuel is supplied through a conduit 2 from a suitable source. Admission of liquid fuel to the receptacle is controlled by means shown more or less conventionally as a float actuated valve. The valve is designated 5 and it is closed by a float 6 when the latter is lifted by an accumulation of liquid in the main part or receiving compartment R of the receptacle, to the level shown in Figs. 1 and 3. The float is fixed to an arm 7, pivoted intermediate its ends on a pin 8 that is supported by a bracket 9; and the end of the arm remote from the float bears on the head 10 of the valve 5, between which head and a tubular guide 11, in which the valve reciprocates, is a helical spring 12 that tends to lift the valve from its seat.

The receptacle 1, preferably consisting of a die cast unit, is formed on its interior with two cylindrical bosses 15 and 16 that rise from the bottom wall of the receptacle and are spaced apart laterally of the receptacle, as shown in Figs. 2 and 3. Between these bosses is a walled structure 17 that encloses a so-called pilot sump or delivery compartment S. Tightly fitted within the boss 16 is the cylinder 18 of a pump, designated generally by the letter P, said cylinder having an inlet port 19 that communicates with the main portion R of the receptacle through a slot 16ª in the side of the boss 16. The pump cylinder is also provided near its upper end with an outlet port 20 that opens, through a notch in the boss 16, into the sump S. By reason of the construction described, the pump is adapted to receive liquid from the main part or receiving compartment R of the receptacle 1 and discharged it into the pilot sump or delivery compartment S. The latter compartment or sump overflows through a passage 21 into the bore 22 of the boss 15, and a pipe 23 establishes communication between said bore and a burner B of the bowl or pot type, a fragment of which is shown in Fig. 3.

Operating within the pump cylinder 18 is a piston 24, the rod 25 of which rises through an opening in the cover 26 of the receptacle 1, where it is guided in a bushing 27 that is suitably fastened in said opening. Supported by a bracket 28, which is secured to and rises from one end of the cover 26, is driving mechanism 30, shown in Fig. 3. This mechanism, described more in detail in the above mentioned application, includes a small electric motor; and to the power take-off shaft 32 of said mechanism is fastened a crank 33. On the pin 34 of the crank is pivoted the upper end of a connecting rod or link 36, to the lower end of which is similarly connected the upper end of the piston rod 25.

It will be understood, therefore, that, as the piston 24 is reciprocated by the mechanism 30, through the connections above described, measured quantities of fuel will be transferred from the compartment R to the sump S and will overflow from the latter through the port 21, bore 22 and conduit 23 to the burner B. It may be explained that, as long as the apparatus is in use at all, the driving mechanism 30 continually functions to cause the pump to deliver the minimum amount of fuel to the burner, such amount being sufficient only to sustain operation at "low" or "pilot" fire. By means of the valve that is controlled by our improved thermostatic device, as will hereinafter more fully appear, additional fuel is supplied to the burner to produce "intermediate" and "high" fires, the valve reposing in intermediate position, to supply fuel for the former, when the thermostatic device is inactive. Upon the heating of one bimetallic strip section of the device, the valve will be moved in one direction to wide open position to produce "high" fire, and when the other section is heated, the valve will be moved in the other direction to closed position so that the burner will operate at "low" or "pilot" fire.

As shown in Figs. 1 and 3, the reduced lower end of the bore 22 terminates at its upper end in a shoulder 40, above which, for a short distance, the diameter of the bore is slightly increased. Above this point, the bore is flared to provide a valve seat 41, from which the bore continues upwardly at its maximum diameter. Communication is established between the part of the bore above the valve seat 41 and the main part or receiving compartment R of the receptacle 1 through ports 42. A valve 45 occupies the bore, the same having a tapered portion 46 for engagement with the seat 41, and a reduced extension 47 therebelow that slidably fits the portion of the bore 22 of minimum diameter, the body portion of the valve above the seat engaging part 46 being of a diameter substantially less than the portion of the bore it occupies. The extension 47 is provided with a slot 48, shown as terminating at its upper end in a cross slot that is slightly spaced below the seat engaging part 46.

The valve 45 has a head or abutment 49 adjacent its upper end between which and an external upwardly facing shoulder 50 of the boss 15 is compressed a coil spring 51. Pivoted on the ends of a pin 52, shown as supported in a part 53 of the cover 26, is a lever 54 having two arms 55 and 56, the former having its outer end engaged with the top of the valve 45. The upward movement of the lever 54, and consequently the lift of the valve 45, is limited by an adjustable stop 57 in the form of a screw that is threaded through the cover 26 and has its lower end disposed above the arm 55. Sustained by the free end of the arm 56 is a pin 58 that is guided through an eyelet or bushing 59 in an aperture of the cover 26.

The thermostatic device that constitutes our invention (which, through the pin or member 58 and lever 54, controls the valve 45) will now be described.

Mounted upon one end of the cover 26 is a relatively shallow, open-bottom casing 60, desirably made of insulating material. The casing is shown as following the contour of the cover in plan, and as being attached to the cover by the same screws 61 that serve to fasten the adjacent end of the cover to the receptacle 1, the opposite end of the cover being fastened to the casing by a screw 63. Secured to the underside of a drop portion of the top wall of the casing 60, by screws 64, is a saddle 65 in the form of an angle plate, the vertical branch of which has a horizontal slot. Engaged for slight rocking movement within said slot is one end of a U-shaped bimetallic unit 68, to the forward end of one branch 68a of which is riveted or otherwise fastened a lug 69. A screw 70 extends freely through a hole in the top wall of the casing 60 and has its lower end threadedly engaged within an aperture of the lug 69, and a coil spring 71 surrounds said screw and is compressed between the lug 69 and the top wall of the casing. Accordingly, the end of the unit 68, remote from the saddle 65, may be raised or lowered by turning the screw 70 and, by means of said screw and the spring 71, it is held in any position to which it is adjusted.

A tongue or extension 73 is riveted or otherwise secured to the free end of the other branch 68b of the unit 68, the same projecting laterally and thence forwardly on the center line of the unit through a vertical slot in the adjacent end wall of the casing 60 beyond which its terminal portion engages the top of the pin or member 58. Thus the thermostatic device has operative connection with said pin or member and, through it and the lever 54, with the valve 45.

Attached, as by clamps or bands 75, to the respective bimetallic strip sections or branches 68a and 68b of the U-shaped unit 68 are electrical resistance heaters 77 and 78. Terminals at the corresponding ends of the two heaters are connected to a common binding post 79 (Fig. 2), while the opposite terminal of the heater 77 leads to a binding post 80, and that of the heater 78, to a binding post 81.

The binding posts extend through depressed side portions of the top wall of the casing 60, as indicated in Fig. 1, and above said portions of the top wall the posts have connected to them electrical conductors 82 and 83. A plate 85, corresponding in size and shape with the top of the casing 60, is shown held to the casing by the screws 61; and said plate closes the spaces above the depressed portions of the top wall occupied by the binding posts. The conductors 82 and 83 form parts of an electrical control system of common character involving a room thermostat (not shown).

By way of describing the operation of the thermostatic device, we shall explain how it functions in conjunction with such a control system to actuate the valve 45 and thus govern the feeding of fuel to the burner B.

When the room thermostat acts in response to a rise in temperature above a limited range for which said thermostat is set, it closes the circuit including the electrical resistance heater 78. Said heater, being thus energized, causes the branch 68b of the unit 68 to warp in the direction shown in Fig. 5 (normal position being indicated by the arrows X in Figs. 4 to 6), thereby to depress the pin or member 58 and, through the lever 54, the valve 45 so as to seat the latter and shut off the flow of fuel directly from the main part or compartment R of the receptacle I to the burner B. The burner now continues to operate on the limited amount of fuel supplied by the pump P.

When the temperature falls sufficiently to cause the room thermostat to return to neutral condition, so to speak, the supply of current to the heater 78 ceases and the bimetallic unit 68 resumes normal condition, as illustrated in Figs. 1 and 4.

Assuming now that the temperature affecting the room thermostat drops below the aforesaid range, said thermostat will close the circuit including the heater 77, causing energization of that heater and a consequential warping of the branch 68a, as indicated in Fig. 6. In the warping of this branch, the unit 68 will rock slightly in the saddle 65, thus causing the free end of the unaffected and accordingly straight branch 68b to rise, permitting the spring 51 to lift the valve 45 the distance permitted by the stop 57. Under these circumstances, the maximum amount of fuel (according to the adjustment of the stop 57) will be supplied to the burner to produce high fire.

It is apparent from the foregoing description of the operation that when neither of the electrical heaters 77 or 78 is energized, the bimetallic unit 68 remains in normal condition. Under these circumstances, the valve 45 is held in the position it occupies during intermediate fire. Therefore, should the electric supply fail from any cause, the heater will continue to operate on intermediate fire. This will provide moderate house heating and prevent water pipes from freezing should the electric power fail during subfreezing weather; while, on the other hand, it would not produce excessive heat in case of power failure during milder weather.

Having thus described our invention, what we claim is:

1. A thermostatic device for controlling the movements of a member, said device comprising a unit including two bimetal strip sections arranged with an end of one section adjacent and joined to an end of the other section, a saddle rockably supporting the joined ends of the sections while restraining the unit against movement out of its own plane in the immediate region of said saddle, anchorage means holding the end of one section remote from said saddle against movement, the end of the other section remote from the saddle having operative connection with said member, and means for supplying heat to each section independently of the other section.

2. A thermostatic device for controlling the movements of a member, said device comprising a substantially U-shaped unit, the side branches of which consist of bimetal strips, a saddle rockably supporting the unit adjacent its closed end while restraining the unit against movement out of its own plane in the immediate region of said saddle, anchorage means holding the end of one branch remote from the saddle against movement, the end of the other branch remote from the saddle having operative connection with said member, and means for supplying heat to each branch independently of the other branch.

3. A thermostatic device for controlling the movements of a member in two directions from an intermediate position, said device comprising a substantially U-shaped bimetal unit, a saddle rockably supporting the unit adjacent its closed end and restraining the unit against movement out of its own plane in the immediate region of said saddle, anchorage means holding the end of one branch of the unit remote from the saddle against movement, the end of the other branch remote from the saddle having operative connection with said member, and means for supplying heat to each branch independently of the other branch.

4. A thermostatic device, according to claim 3, wherein said unit consists of a substantially rectangular, bifurcated piece of bimetallic sheet material providing two branches integrally connected together at one end of the unit.

5. A thermostatic device for controlling the movements of a member in two directions from an intermediate position, said device comprising a substantially U-shaped bimetal unit, a saddle rockably supporting the unit adjacent its closed end while restraining the unit against movement out of its own plane in the immediate region of said saddle, a lug attached to the end of one branch remote from the saddle, screw means threadedly engaged with said lug for rocking the unit in the saddle and thus changing the angular position of the unit with respect to the saddle, and for holding the unit in any position to which it is adjusted, the end of the other branch remote from the saddle having operative connection with said member, and means for supplying heat to each branch independently of the other branch.

6. A thermostatic device for controlling the movements of a member in two directions from an intermediate position, said device comprising a substantially U-shaped bimetal unit, a saddle rockably supporting the unit adjacent its closed end while restraining the unit against movement out of its own plane in the immediate region of said saddle, anchorage means for holding the end of one branch of the unit remote from the saddle against movement, an extension attached to the end of the other branch remote from the saddle, said extension having operative connection with the member, and means for supplying heat to each branch independently of the other branch.

7. In combination, a casing, a saddle therein provided with a slot, a U-shaped bimetallic unit having its closed end rockably supported in said slot, the casing having an aperture in a wall thereof adjacent the end of one branch of said unit remote from the saddle, a screw extending freely through said aperture and threadedly connected to said end of the beforementioned branch, a spring urging said branch in a direction away from said wall, the end of the other branch of said unit remote from the saddle having operative connection with a member whose movements are subjected to those of said unit, and two electrical resistance heaters, each heater being arranged in intimate heat exchanging relation to a respective branch of said unit.

8. In combination, a casing, a saddle therein provided with a slot substantially parallel to the plane of a wall portion of said casing, said wall portion having an aperture, an integral U-shaped unit of bimetallic sheet material having its closed end rockably supported in said slot, a lug connected to the end of one branch of said unit remote from the saddle, said lug having a threaded hole in axial alignment with the aforesaid aperture, a screw extending freely through the aperture and threadedly engaged within the hole of the lug, a coil spring surrounding said screw and compressed between the lug and said wall portion of the casing, a tongue-like extension secured to and projecting beyond the end of the other branch of said unit remote from the saddle, said extension having operative connection with a member whose movements are subjected to those of said unit, and two electrical resistance heaters, each heater being arranged in intimate heat exchanging relation to a respective branch of said unit.

9. A thermostatic device for controlling the movements of a member, said device comprising a unit including two bimetal strip sections arranged with an end of one section adjacent and joined to an end of the other section, a saddle rockably supporting the joined ends of the sections while restraining the unit against movement out of its own plane in the immediate region of the saddle, anchorage means holding the end of one section remote from said saddle against movement, said anchorage means being adjustable to rock the unit and thus change the angular position of the unit with respect to the saddle, the end of the other section remote from the saddle having operative connection with said member, and means for supplying heat to each section independently of the other section.

MARC RESEK.
HOLDEN B. TOWNLEY.

REFERENCES CITED

The following references are of record in the file of this patent:

UNITED STATES PATENTS

| Number | Name | Date |
|---|---|---|
| 2,083,780 | Gille | June 15, 1937 |